J. B. MENDENHALL.
BEARING.
APPLICATION FILED MAR. 22, 1911.

1,003,485.

Patented Sept. 19, 1911.

Witnesses
J. Milton Jester
B. H. Washburne

Inventor
J. B. Mendenhall

By C. L. Parker
Attorney

UNITED STATES PATENT OFFICE.

JOHN B. MENDENHALL, OF KANSAS CITY, MISSOURI.

BEARING.

1,003,485.  Specification of Letters Patent.  Patented Sept. 19, 1911.

Application filed March 22, 1911. Serial No. 616,269.

*To all whom it may concern:*

Be it known that I, JOHN B. MENDENHALL, a citizen of the United States, residing at Kansas City, in the county of Jackson and State of Missouri, have invented certain new and useful Improvements in Bearings, of which the following is a specification.

My invention relates to bearings, and has particular reference to a method of making a bearing provided with a bushing embedded therein to lubricate the parts under friction.

An important object of this invention is to provide a bearing which will be self-lubricating, economical in use, and cheap to manufacture.

A further object of this invention is to provide a bearing having graphite embedded in the brass thereof in such a manner as to be integral with said brass, and so disposed that as the engaging surface of the brass is worn away the graphite will be also worn away, to lubricate the desired parts.

A further of this invention is to provide means whereby graphite may be economically and advantageously employed as a lubricant, in connection with a bearing.

Other objects and advantages of this invention will be apparent during the course of the following description.

Figure 1:
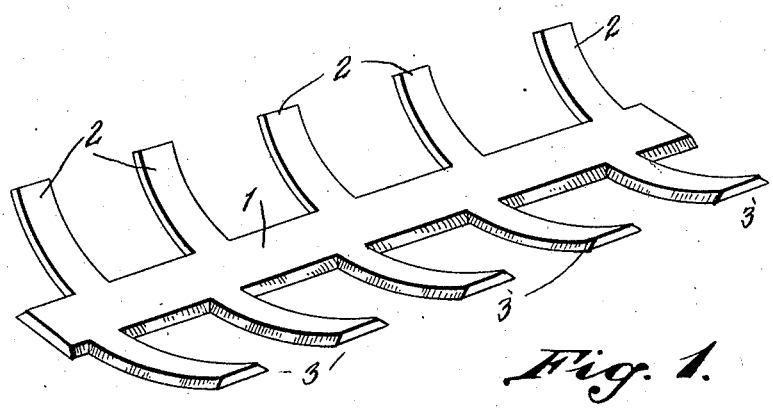
Figure 2:
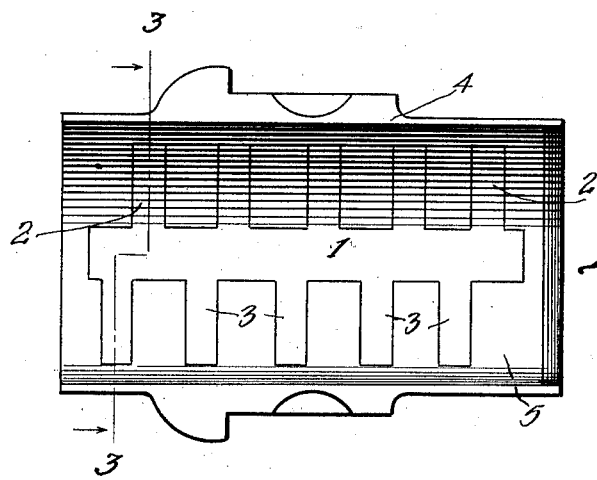
Figure 3:
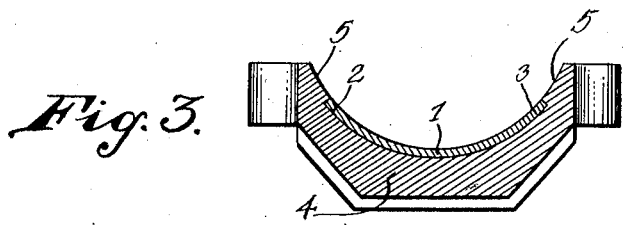

In the accompanying drawings forming a part of this specification, and in which like numerals are employed to designate like parts throughout the same, Figure 1 is a perspective view of the bushing, Fig. 2 is a plan view of a bearing, having the bushing embedded therein, and Fig. 3 is a cross-sectional view, taken on line 3—3 of Fig. 2.

In carrying out the invention, I take graphite in a flaky or powdered state and mix the same with a binder, such as soap or tallow, with or without a certain amount of air-floated mica. This mass has about the consistency of putty. The mass is next compressed in a suitable mold, to form a bushing of the requisite shape, and then subjected to a desired degree of heat, while under pressure, to cause the same to be baked or hardened. The bushing thus made is set up in a suitable mold and molten metal, preferably brass, is poured around the same, to form a journal bearing of suitable shape with the graphite bushing permanently embedded therein, said bushing and bearing being in effect integral. The face of the bushing is flush with the working face of the bearing, and forms, in effect, a portion of such working surface.

In the drawings wherein is illustrated a preferred embodiment of my invention, a bushing is shown, formed of graphite and soap or tallow, as above stated. This bushing comprises a longitudinal shank 1, carrying oppositely extending curved arms 2 and 3. The bushing is embedded in a metal bearing 4, by casting such bearing about the same, as hereinabove stated. The shank 1 and arms 2 and 3 of the bushing are flush with the working surface 5 of the bearing 1, as shown, and form in effect, a portion of such working surface. By casting the brass bearing about the bushing, such bushing and bearing become in effect integral. I have found that my method is particularly advantageous, since the bushing is permanently embedded in the brass, whereby such bushing will not crumble, or fall out of the brass. The journal bearing may also be formed cheaply by casting the brass about the bushing.

I wish it understood that the form of my invention herewith shown and described is to be taken as a preferred example of the same and that certain changes may be made therein without departing from the spirit of my invention as set forth in the subjoined claims.

Having thus described my invention, I claim:—

The herein described method of making a journal bearing, comprising the forming of a bushing entirely out of graphite and soap, shaping the same into suitable form, compressing the bushing and heating the same whereby it is hardened and baked, positioning the bushing in a mold, and pouring molten metal around the bushing, whereby said bushing becomes embedded in the metal and has its working face flush with the working face of the metal.

In testimony whereof I affix my signature in presence of two witnesses.

JOHN B. MENDENHALL.

Witnesses:
  ROBT. L. O'NEIL,
  L. L. HOPPER.

---

Copies of this patent may be obtained for five cents each, by addressing the "Commissioner of Patents, Washington, D. C."